(12) United States Patent
Smits (10) Patent No.: US 8,184,108 B2
(45) Date of Patent: May 22, 2012

(54) APPARATUS AND METHOD FOR A FOLDED OPTICAL ELEMENT WAVEGUIDE FOR USE WITH LIGHT BASED TOUCH SCREENS

(75) Inventor: Gerard Dirk Smits, Los Gatos, CA (US)

(73) Assignee: Poa Sana Liquidating Trust, Mountain View, CA (US)

( * ) Notice: Subject to any disclaimer, the term of this patent is extended or adjusted under 35 U.S.C. 154(b) by 1030 days.

(21) Appl. No.: 10/923,550

(22) Filed: Aug. 20, 2004

(65) Prior Publication Data

US 2006/0001653 A1    Jan. 5, 2006

Related U.S. Application Data (60) Provisional application No. 60/584,728, filed on Jun. 30, 2004.

(51) Int. Cl.
G06F 3/041    (2006.01)
(52) U.S. Cl. .......................... 345/175; 345/173
(58) Field of Classification Search .................. 345/156, 345/14, 172, 175, 173, 176; 178/18.09, 18.11
See application file for complete search history.

(56) References Cited

U.S. PATENT DOCUMENTS

| | | | | |
|---|---|---|---|---|
| 4,746,770 A |   | 5/1988 | McAvinney | 178/18.09 |
| 4,851,616 A | * | 7/1989 | Wales et al. | 345/175 |
| 5,414,413 A |   | 5/1995 | Tamaru et al. | 345/175 |
| 5,914,709 A |   | 6/1999 | Graham et al. | 345/179 |
| 6,181,842 B1 | * | 1/2001 | Francis et al. | 385/14 |
| 6,351,260 B1 | * | 2/2002 | Graham et al. | 345/179 |
| 6,421,042 B1 | * | 7/2002 | Omura et al. | 345/157 |
| 6,429,857 B1 | * | 8/2002 | Masters et al. | 345/175 |
| 6,498,602 B1 | * | 12/2002 | Ogawa | 345/173 |
| 2004/0212603 A1 | * | 10/2004 | Cok | 345/175 |
| 2004/0263482 A1 | * | 12/2004 | Goertz | 345/173 |

FOREIGN PATENT DOCUMENTS

| | | |
|---|---|---|
| WO | WO 98/40844 | 9/1998 |
| WO | WO 02/48853 | 6/2002 |
| WO | WO 02/095668 | 11/2002 |

OTHER PUBLICATIONS

International Search Report in corresponding PCT Application PCT/US2005/022948 mailed Jul. 13, 2007.
Written Opinion in corresponding PCT Application PCT/US2005/022948 mailed Jul. 13, 2007.

* cited by examiner

*Primary Examiner* — Yong H Sim
(74) *Attorney, Agent, or Firm* — Beyer Law Group LLP (57) ABSTRACT

A folded optical element waveguide that allows a minimum width bezel to be used around the perimeter of a light-based touch screen display. The apparatus and method includes a touch screen and a waveguide substrate provided adjacent the touch screen. The waveguide substrate includes a plurality of waveguides and a plurality of optical elements provided adjacent the touch screen. The waveguides include an internally reflective surface to reflect light perpendicular to the surface of the touch screen. The emitting and detecting waveguides are thus folded and provided around the side edges of the display. As a result, the width of the bezel around the display can be minimized.

6 Claims, 7 Drawing Sheets

APPARATUS AND METHOD FOR A FOLDED OPTICAL ELEMENT WAVEGUIDE FOR USE WITH LIGHT BASED TOUCH SCREENS

CROSS REFERENCE TO RELATED APPLICATIONS

This patent application claims the benefit of Provisional Patent Application Ser. No. 60/584,728, filed Jun. 30, 2004, which is incorporated herein by reference for all purposes.

BACKGROUND OF THE INVENTION

1. Field of the Invention

The present invention relates generally light based to touch screen displays, and more particularly, to an apparatus and method for a folded optical element waveguide that allows a minimum width bezel to be used around the perimeter of the touch screen display.

2. Description of the Related Art

User input devices for data processing systems can take many forms. Two types of relevance are touch screens and pen-based screens. With either a touch screen or a pen-based screen, a user may input data by touching the display screen with either a finger or an input device such as a stylus or pen.

One conventional approach for providing a touch or pen-based input system is to overlay a resistive or capacitive film over the display screen. This approach has a number of problems. Foremost, the film causes the display to appear dim and obscures viewing of the underlying display. To compensate, the intensity of the display screen is often increased. However, in the case of most portable devices, such as cell phones, personal digital assistants, and laptop computers, high intensity screens are usually not provided. If they are provided, the added intensity requires additional power, reducing the life of the battery of the device. The films are also easily damaged. These films are therefore not ideal for use with pen or stylus input devices. The motion of the pen or stylus may damage or tear the thin film. This is particularly true in situations where the user is writing with a significant amount of force. In addition, the cost of the film scales dramatically with the size of the screen. With large screens, the cost is therefore typically prohibitive.

Another approach to providing touch or pen-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either a finger or pen, the interruptions in the light beams are detected by the corresponding X and Y photodiodes on the opposite side of the display. The data input is thus determined by calculating the coordinates of the interruptions as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

Yet another approach involves the use of polymer waveguides to both generate and receive beams of light from a single light source to a single array detector. These systems tend to be complicated and expensive and require alignment between the transmit and receive waveguides and the optical elements and the waveguides. The waveguides are usually made using a lithographic process that can be expensive or difficult to source. In addition, the waveguides are typically flat. As a consequence, the bezel around the display is relatively wide. See for example U.S. Pat. No. 5,914,709.

Accordingly, there is a need for a folded optical element waveguide that allows a minimum width bezel to be used around the perimeter of a touch screen display.

SUMMARY OF THE INVENTION

The present invention relates to an apparatus and method for a folded optical element waveguide that allows a minimum width bezel to be used around the perimeter of a light-based touch screen display. The apparatus and method includes a touch screen and a waveguide substrate provided adjacent the touch screen. The waveguide substrate includes a plurality of waveguides and a plurality of optical elements provided adjacent the touch screen. The waveguides include an internally reflective surface to reflect light perpendicular to the surface of the touch screen. The emitting and detecting waveguides are thus folded and provided around the side edges of the display. As a result, the width of the bezel around the display can be minimized.

BRIEF DESCRIPTION OF THE DRAWINGS

The invention, together with further advantages thereof, may best be understood by reference to the following description taken in conjunction with the accompanying drawings in which.

In the figures, like reference numbers refer to like components and elements.

DETAILED DESCRIPTION OF THE INVENTION

Figure 1:
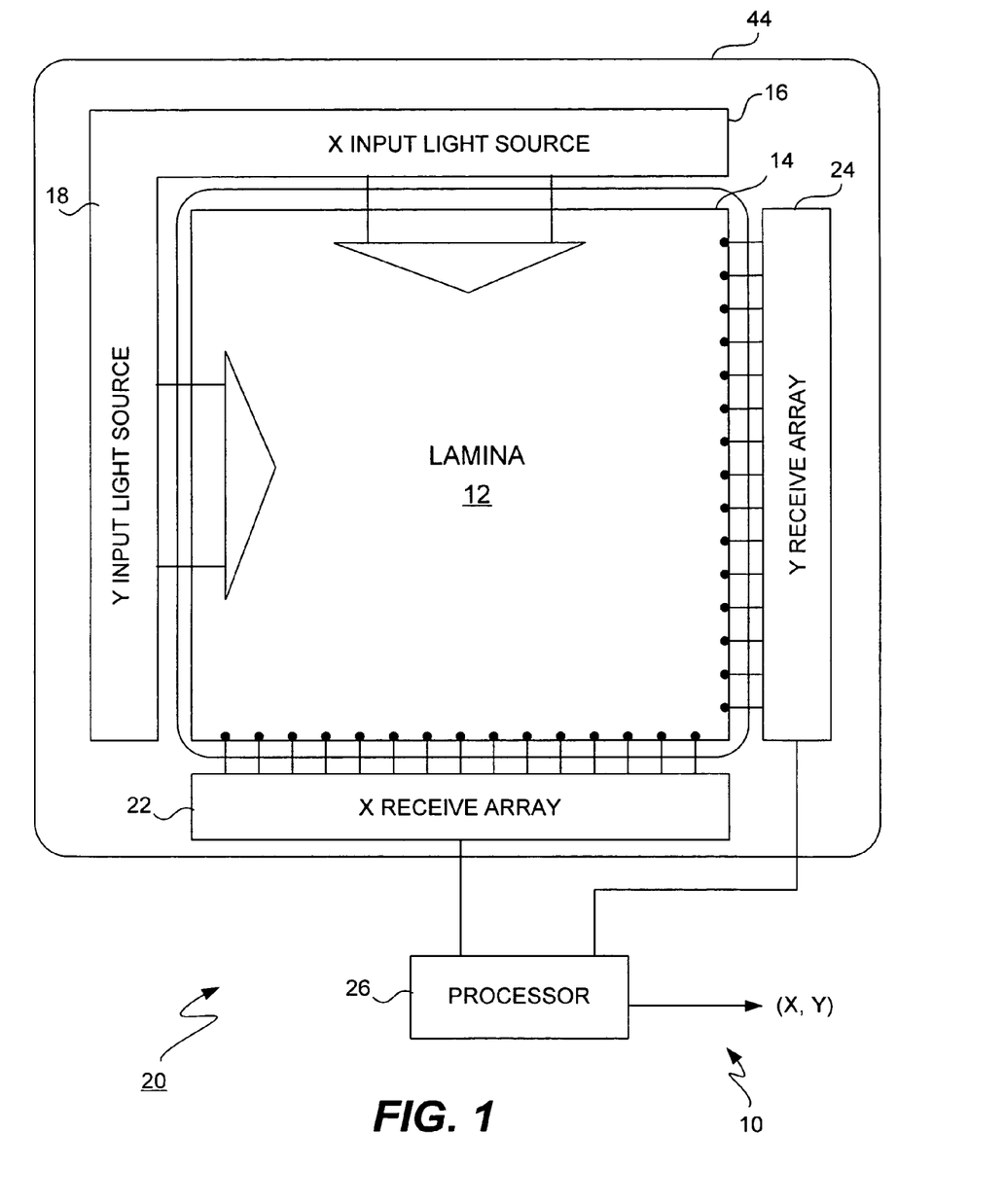
FIG. 1 is a touch screen display device.

Referring to FIG. 1, a touch screen data input device according to one embodiment of the invention is shown. The data input device 10 defines a continuous sheet or "lamina" 12 of light in the free space adjacent a touch screen 14. The lamina 12 of light is created by X and Y input light sources 16 and 18 respectively. An optical position detection device 20, optically coupled to the lamina of light, is provided to detect data entries to the input device by determining the location of interrupts in the lamina 12 caused when data is entered to the input device. The optical position detection device 20 includes an X receive array 22, a Y receive array 24, and a processor 26. The X and Y input light sources 16 and 18 and the X and Y receive arrays 22 and 24 are clad in a bezel 28 that surrounds the lamina 12 and the touch screen 14.

During operation, a user makes a data entry to the device 10 by touching the screen 14 using an input device, such as a pen, stylus or finger. During the act of touching the screen with the input device, the lamina 12 of light in the free space adjacent the screen is interrupted. The X receive array 22 and Y receive array 24 of the optical position detection device 20 detect the interrupt. Based on the X and Y coordinates of the interrupt, the processor 26 determines the data entry to the device 10. For more information on the data entry device 10, see co-pending, U.S. application Ser. No. 10/817,564, entitled Apparatus and Method for a Data Input Device Using a Light Lamina Screen and an Optical Position Digitizer, filed Apr. 1, 2004, and incorporated by reference herein for all purposes.

Figure 2:
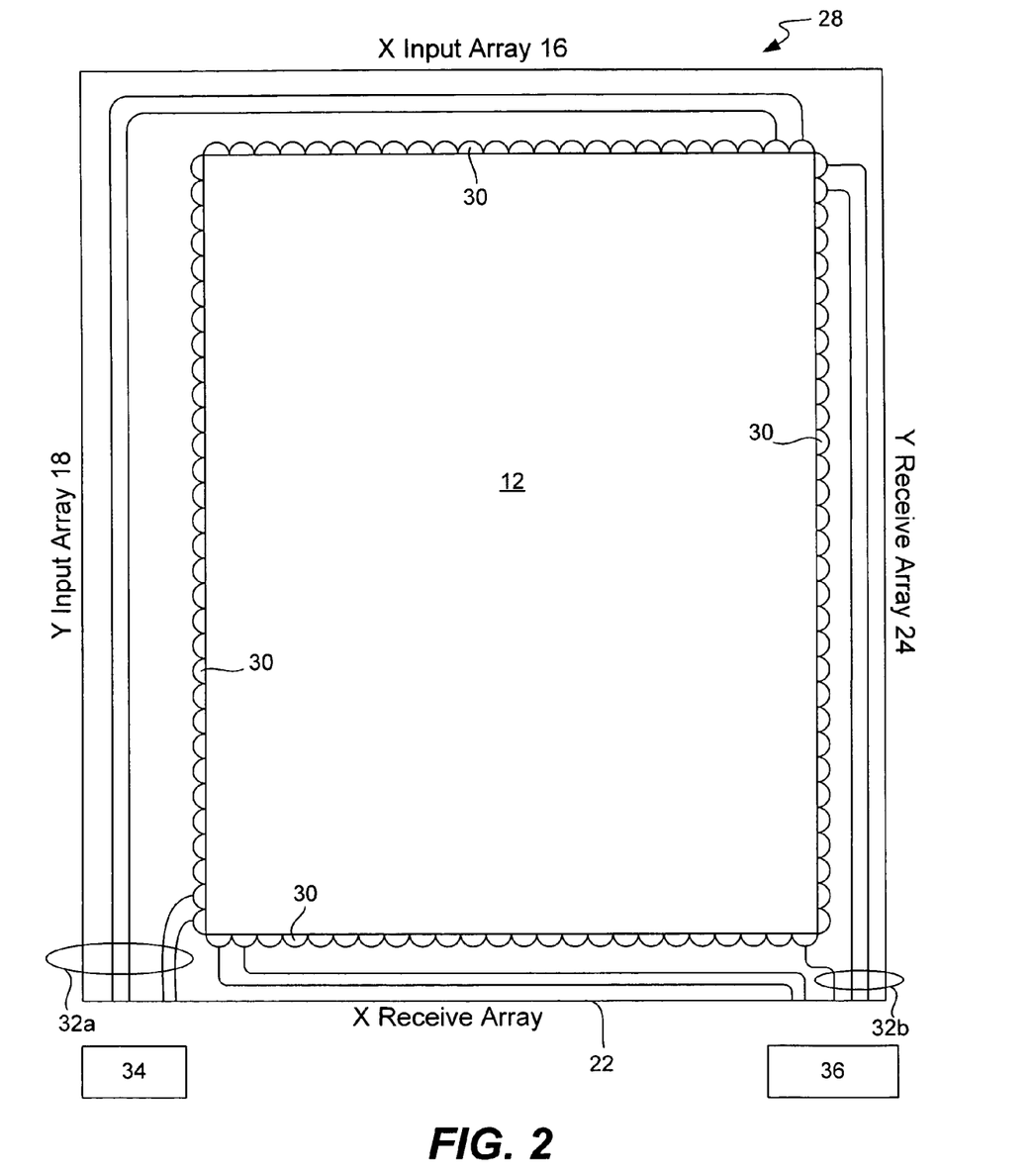
FIG. 2 is a bezel used around the perimeter of the touch screen display device.

Referring to FIG. 2, an enlarged view of the bezel 28 is shown. The bezel 28 has four sides, the X and Y light input arrays 16, 18 and the X and Y light receive arrays 20, 22. A plurality of optical elements 30 are provided along the inner periphery of the bezel 28. A plurality of waveguides 32 are optically coupled to the plurality of optical elements 30 respectively. A first subset of the waveguides 32a extend between a light source 34, such as a laser, and the optical elements 30 of the light input arrays 16, 18 respectively. A second subset of the waveguides 32b extend between an imaging device 36, such as a charge coupled device or MOS imaging chip, and the optical elements 30 of the light receive arrays 20, 22 respectively. The two subsets of waveguides 32a and 32b each form what is sometimes referred to as a "waveguide highway". The pitch of the individual waveguides 32 along the highway may vary but typically is 1.6 microns. In various embodiments of the invention, the optical elements 30 are vertically collimated lenses.

Figure 3:
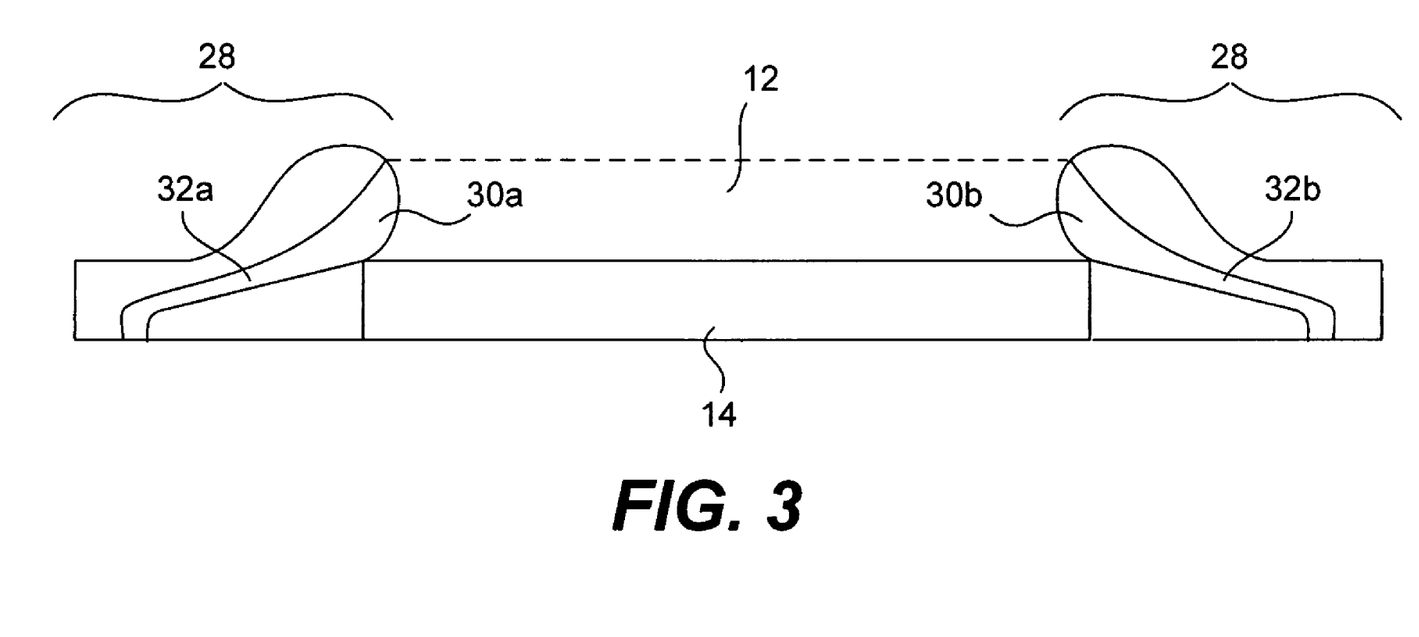
FIG. 3 is a cross section of the bezel used around the perimeter of the touch screen device.

Referring to FIG. 3, a cross section of the data input device 10 is shown. The cross section shows the lamina 12 created over the touch screen 14. In various embodiments, the lamina 12 may range in thickness from 1 to 4 millimeters. The cross section shows two optical elements 30 positioned on opposite sides of the lamina 12. As described above, one of the optical elements 30 (e.g., 30a) is used for light input to create the lamina 12 and the other (e.g., 30b) is used to detect data entries (i.e., interrupts in the lamina). Waveguides 32a and 32b are optically coupled to the two optical elements 30a and 30b respectively. The optical elements 30a, 30b and the waveguides 32a, 32b are integral or clad in the bezel 28.

With light based input devises such as that illustrated in FIG. 1, a high degree of resolution is typically desired. To achieve the desired finer resolution, a larger number of relatively small optical elements 30 are required around the periphery of the bezel 28. Since each optical element 30 has a corresponding waveguide 32, the waveguide highways 32a and 32b can become relatively wide. As a result, the width of bezel 28 also becomes very wide. With portable devices, such as cell phones, personal digital assistants, or laptops, a wide bezel surrounding the touch display is less than desirable.

Figure 4:
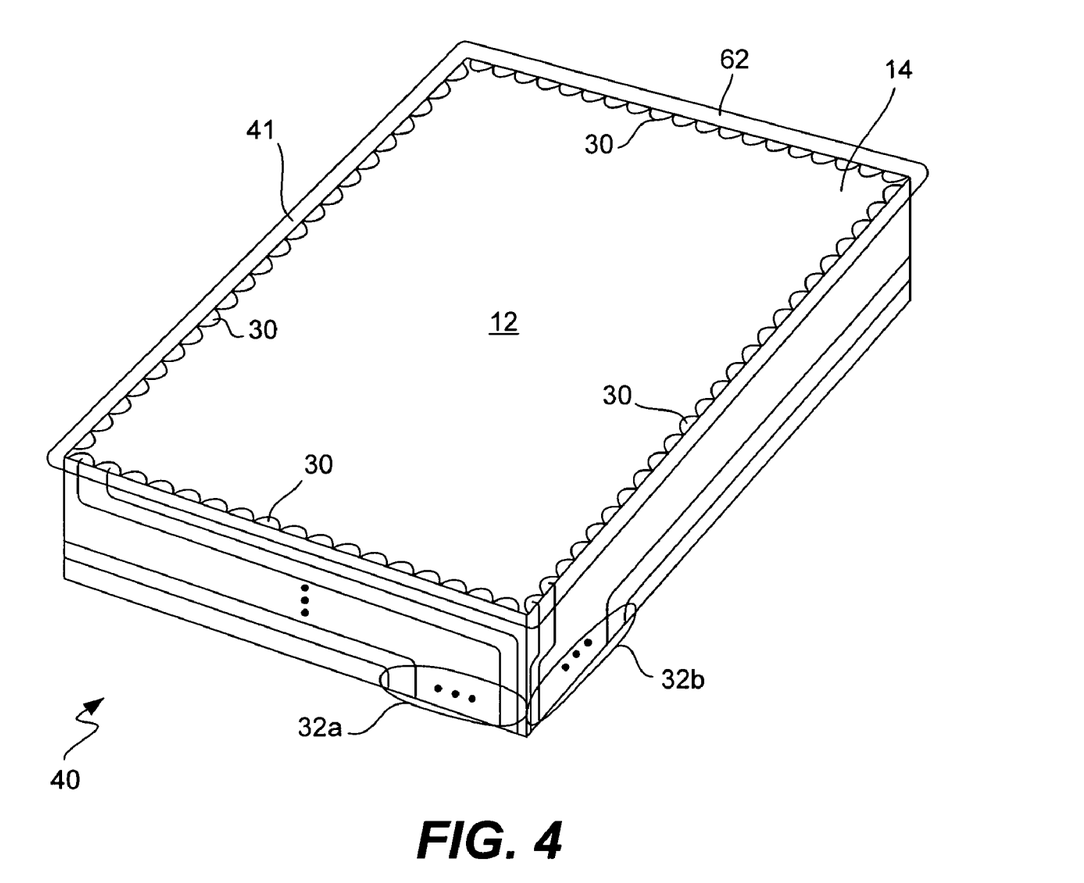
FIG. 4 is a perspective view of a folded waveguide substrate and bezel used around the touch screen display device according to the present invention.

Referring to FIG. 4, a perspective view of a folded waveguide substrate 40 according to the present invention is shown. The folded waveguide substrate 40 includes a plurality of optical elements 30 embedded or integral in a bezel 41 surrounding the periphery of a touch screen 14. The substrate 40 is considered "folded" because the individual waveguides 32 bend from the top surface to a side or vertical surface of the substrate 40. Within each waveguide 32, a forty-five degree cut surface creates an internally reflective mirror, creating an orthogonal light path between the top and a vertical side surface of the substrate 40. Thus on the transmit side, light travels from a light source (not shown), down the individual waveguides 32a along one or more side surfaces of the substrate 40. Each waveguide 32 eventually bends upward along the vertical axis of the substrate 40. At the fold, the mirrored surface internally reflects the light from the vertical to the horizontal axis, and then through the corresponding optical element 30. On the receive side, light enters through the plurality the optical elements 30, is internally reflected off the mirrored surfaces, and then travels along the corresponding waveguides 42 along the side surface or surfaces of substrate 40 to an imaging device (not shown).

Figure 5:
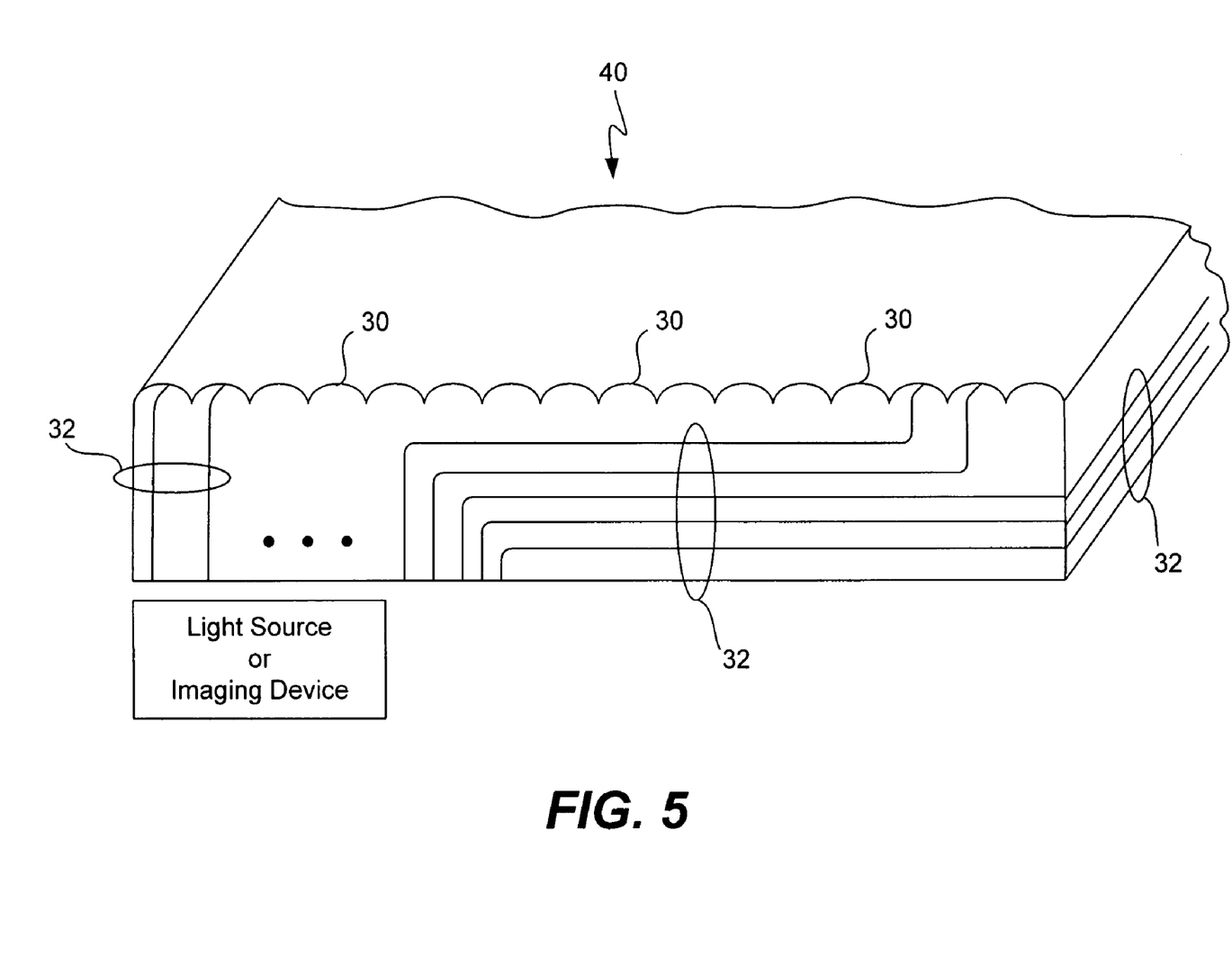
FIG. 5 is a side view of the folded waveguide and bezel of the present invention.

Referring to FIG. 5, a view of one of the sides of substrate 40 is shown. In this view, the optical elements 30 are shown along the top perimeter of the substrate 40 and the various highways of waveguides 32 are shown traveling along the side of the substrate 40. In the location of each optical element 30, the corresponding waveguide 32 bends upward along the vertical axis defined by the side of the substrate 40. The vertical axis is perpendicular to the horizontal axis of the display 14.

Figure 6A:
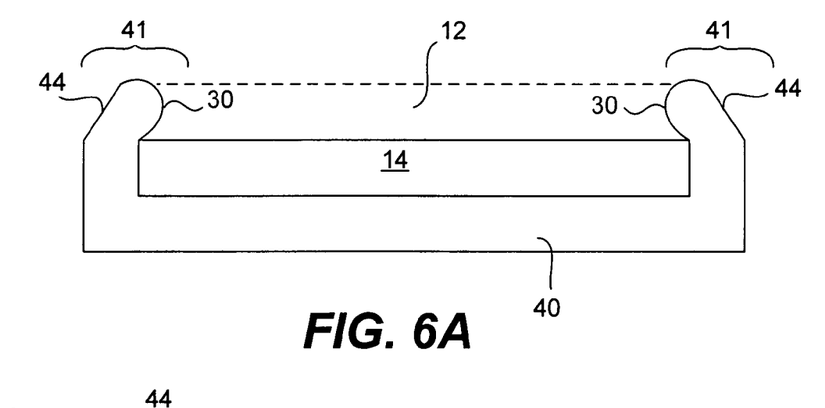
FIG. 6A is a cross section view of the folded waveguide and bezel of the present invention.

Referring to FIG. 6, a cross section of a folded optical element waveguide substrate 40 is shown. The waveguide substrate 40 is positioned adjacent the touch screen 14. In the cross section, two optical elements 30 are shown on opposite sides of the screen 14. As is illustrated, each optical element 30 includes an internally reflective surface 44. The reflective surface 44 creates a mirror internal to the optical element that allows light to reflect from the vertical axis to the horizontal axis, or vice-versa, depending if the waveguide is used for emitting or detecting. The mirrored surface 44 creates a ninety degree deflection of the light beams perpendicular to the display surface of the touch screen 14. Consequently, the waveguides 32 can be provided on the side/surfaces of the substrate 40. The width of the bezel 41 surrounding the touch screen 14 is therefore minimized.

Figure 6B:
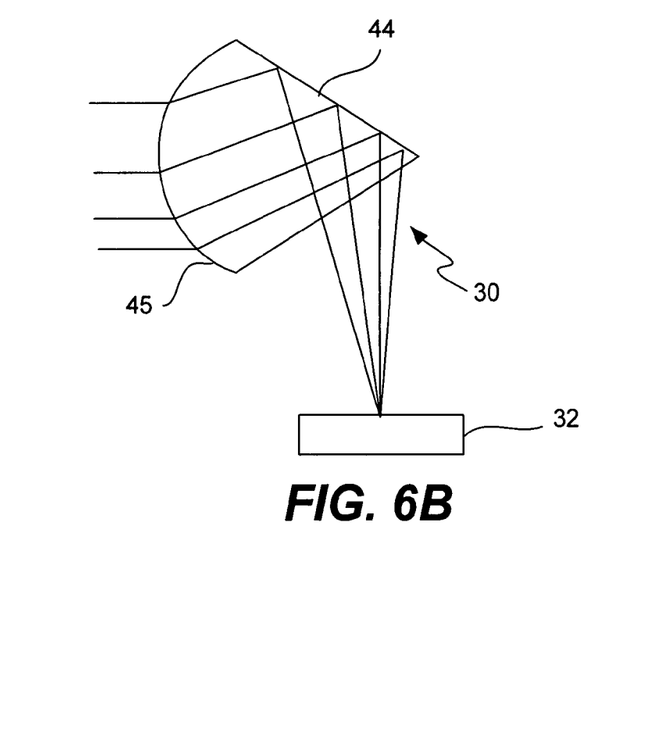
FIGS. 6B and 6C are enlarged diagrams of folded waveguides according to the present invention.

Referring to FIG. 6B, one embodiment of an optical element 30 is shown. In this embodiment, the optical element has a curved lens surface 45 that is configured to focus received light rays onto the internally reflective surface 44. The internally reflected surface 44 directs the reflected light to a single point located in the vicinity of the waveguide 32. In this manner, light received from the lamina 12 through the curved lens in one axis is directed to the waveguide 32 in a perpendicular axis and vice versa.

Figure 6C:
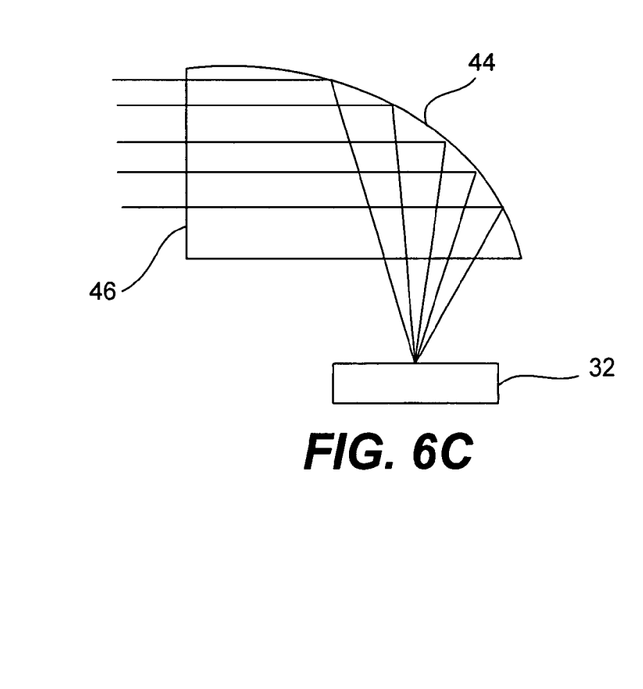

Referring to FIG. 6C, another embodiment of an optical element 30 is shown. In this embodiment, the optical element 30 has a flat lens surface 46 that is configured to focus received light rays onto a curved internally reflective surface 44. The internally reflected surface 44 directs the reflected light to a single point located in the vicinity of the waveguide 32. In this manner, light received from the lamina 12 through the flat lens 46 in one axis is directed to the waveguide 32 in a perpendicular axis and vice versa.

Figure 7:
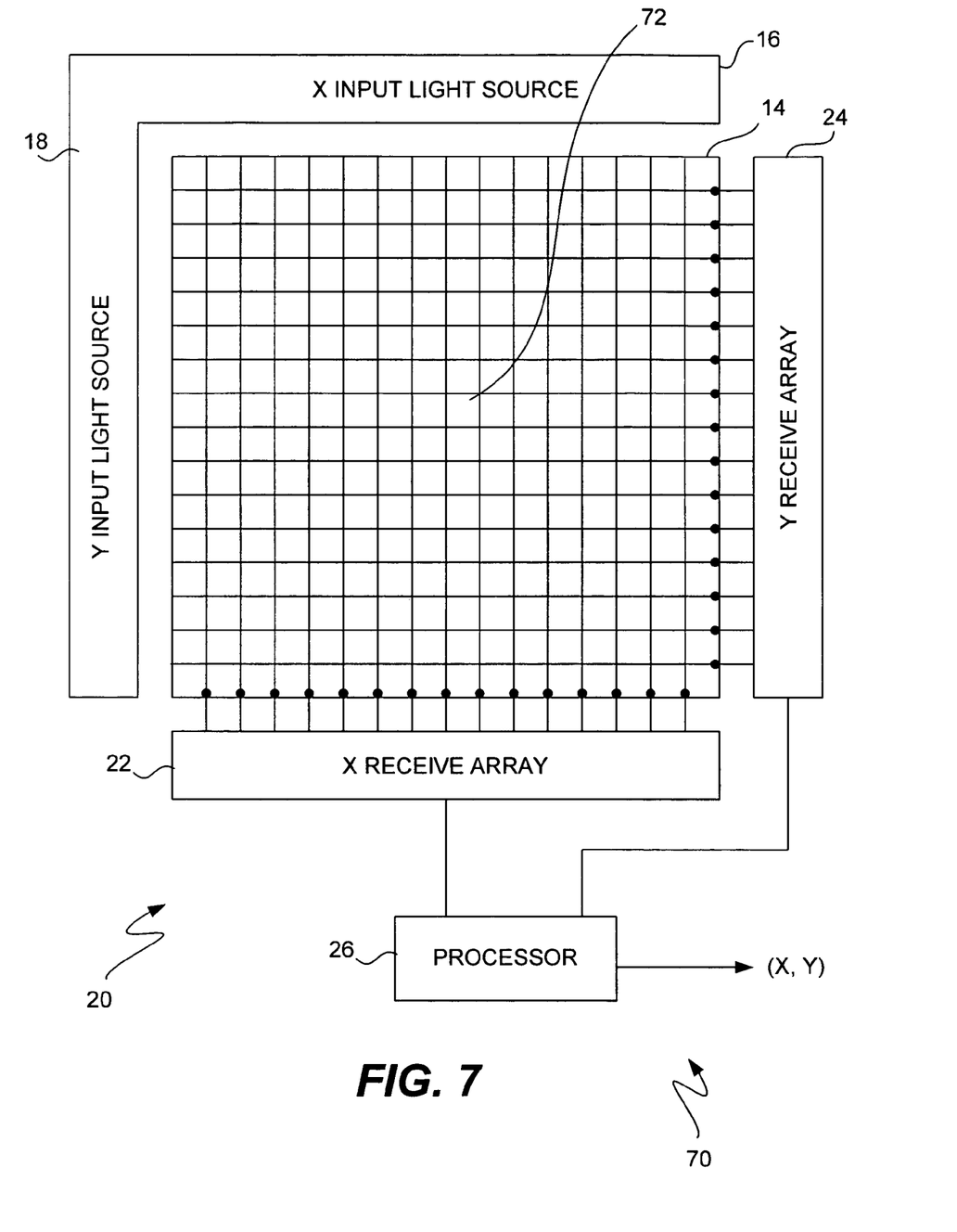
FIG. 7 is another touch screen device that can be used with the folded waveguide and bezel of the present invention.

Referring to FIG. 7, another touch screen display device is shown. The data input device 70 defines a grid of light 32 in the free space adjacent to a touch screen 14. The grid of light 72 is created by an X and Y input light sources 16 and 18 respectively. An optical position detection device 20, optically coupled to the grid of light 72 of light, is provided to detect data entries to the input device by determining the location of interrupts in the grid of light 72 caused when data is entered to the input device. The optical position detection device 20 includes an X receive array 22, a Y receive array 24, and a processor 26. During operation, a user makes a data entry to the device 10 by touching the screen 14 using an input device, such as stylus, pen or a finger. During the act of touching the screen with the input device, the grid of light 32 in the free space adjacent the screen is interrupted. The X receive array 22 and Y receive array 24 of the optical position detection device 20 detect the X and Y coordinates of the interrupt. Based on the coordinates, the processor 26 determines the data entry to the device 10. In an alternative embodiment of the invention, the folded substrate 40 with the minimized bezel 41 as described above with regard to FIGS. 4-6 can be used with the light based grid input device 70.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method, comprising,
providing a waveguide substrate having a substantially flat upper resting surface bounded, at least in part, by a wall that extends above the resting surface, the wall having a inner surface that is adjacent to the resting surface and an outer surface that is on the opposite side of the wall from the inner surface,
the substrate further comprising a plurality of waveguides arranged on the outer surface of the wall with each waveguide comprising an optical fold that redirects light in the waveguides at a right angle from an originating direction, and
a touch screen arranged on the flat upper resting surface; and
wherein said providing of the waveguide substrate comprises providing a substrate having the plurality of waveguides arranged in grooves made on the outer surface of the wall thereby comprising a plurality of embedded waveguides each comprising an optical fold that redirects light in the waveguides at said right angle from an originating direction such that the waveguides perform one of:
directing light over the touch screen; and
receiving light from adjacent the touch screen and directing it to a light detector that is not located on the flat upper resting surface.

2. An apparatus, comprising;
a folded waveguide substrate having a top surface and an outer wall that defines an outer vertical wall surface of the substrate, the outer vertical wall surface and the top surface comprising non-parallel surfaces,
a plurality of waveguide grooves contiguously extending along and extending into the outer vertical wall surface and extending into a portion of the top surface of the substrate;
a touch screen arranged on a portion of the top surface of the folded waveguide substrate;
a plurality of contiguous waveguides formed inside the plurality of waveguide grooves to define a pattern of embedded contiguous waveguides, such that each waveguide is in contact with and extends along the outer vertical wall surface and a portion of the top surface of the waveguide substrate, each waveguide comprising,
an optical element formed at a terminal end of the waveguide at the top surface of the waveguide;
an opposing end at an opposite end of the waveguide from said terminal end;
the waveguides further arranged so that each opposing end is optically coupled with one of a light source or a light receiving device; and
said light source or a light receiving device located at a position other than said top surface of the substrate.

3. The apparatus of claim 2 wherein the folded waveguide substrate includes an edge at an interface between the top surface of the substrate and the outer vertical wall surface of the substrate such that the edge defines a right angle between said top surface and outer vertical wall surface of the substrate; and
wherein each of the contiguous waveguides includes an integral reflective optical element formed in the waveguide at said edge of the substrate enabling light to be reflected from a first direction of travel to a second direction of travel perpendicular to said first direction.

4. The apparatus of claim 2 wherein the folded waveguide substrate further includes an inner wall surface that circumscribes the top surface upon which the touch screen is arranged and wherein the touch screen is arranged on the top surface inside the inner wall surface.

5. The apparatus of claim 3 wherein said integral reflective optical element of said contiguous waveguide comprises a 45 degree angle cut surface arranged to enable light to be reflected in the desired direction in the waveguide.

6. A method, comprising;
providing a waveguide substrate having a substantially flat upper resting surface bounded, at least in part, by a wall that extends above the resting surface, the wall having a inner surface that is adjacent to the resting surface and an outer surface that is on the opposite side of the wall from the inner surface,
the waveguide substrate further including a plurality of waveguides arranged on the outer surface of the wall with each waveguide comprising an optical fold that redirects light in the waveguides at a right angle from an originating direction, and
a touch screen arranged on the flat upper resting surface,
wherein the wall is generally rectangular in shape with the outer vertical wall surface of the wall having four side surfaces and wherein each of said fours sides includes a plurality of grooves made in the side surfaces, the grooves made substantially parallel with the associated side surface in which it is made;
wherein the plurality of waveguides includes subsets of waveguides, with each subset comprising a multiplicity of waveguides that are arranged on a specific one of the four surfaces, each waveguide of said multiplicity of waveguides arranged in the grooves of a corresponding one of said four side surfaces, such that said waveguides lie in the grooves and run substantially parallel with the side surface; and
the optical fold of each subset of waveguides arranged such that said optical fold redirects light in the waveguides in a direction perpendicular to that of the surface on which said waveguides are arranged.

* * * * *